Aug. 4, 1964    A. UNTHANK    3,143,120
APPARATUS FOR WASHING BOTTLES OR THE LIKE
Filed Jan. 28, 1963    2 Sheets-Sheet 1
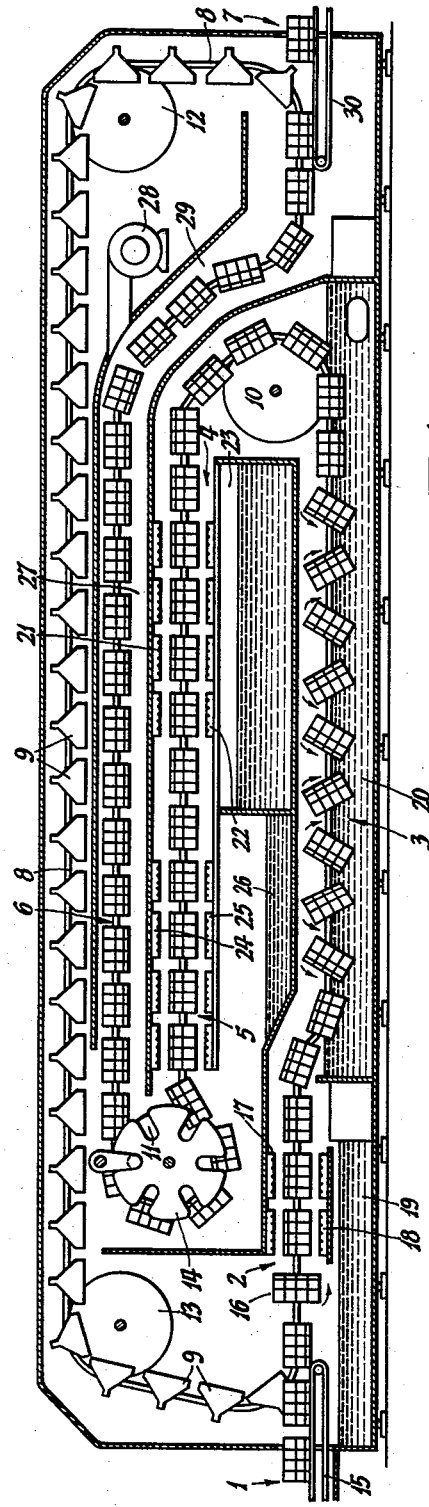
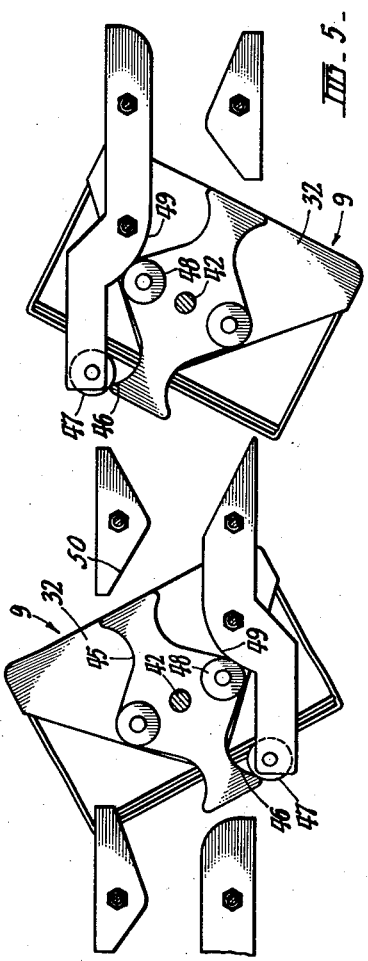
INVENTOR
ALEXANDER UNTHANK

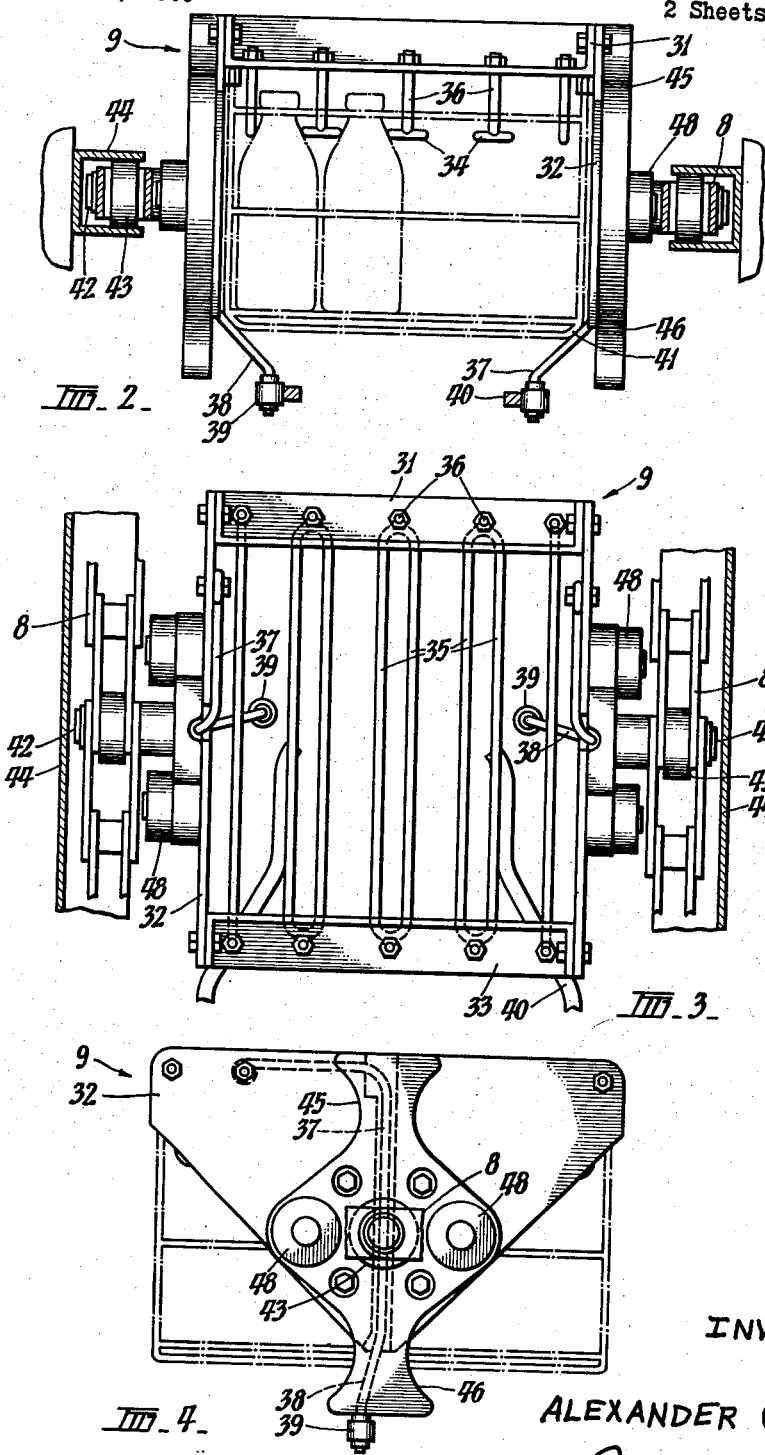

United States Patent Office 3,143,120
Patented Aug. 4, 1964

3,143,120
APPARATUS FOR WASHING BOTTLES OR THE LIKE
Alexander Unthank, Kensington, Victoria, Australia, assignor to In-Crate Bottling Co. Proprietary Limited, Kensington, Victoria, Australia, a corporation of Victoria, Australia
Filed Jan. 28, 1963, Ser. No. 254,090
8 Claims. (Cl. 134—73)

This invention relates to an apparatus for washing bottles or the like, particularly milk bottles.

Empty milk bottles usually arrive at dairies or milk processing plants in crates. The present method is to remove the empty bottles from the crates, wash the bottles in a bottle washing machine and, after the bottles have been filled and capped, place them back into the crates for distribution to customers. This method is costly under present economic conditions and is not altogether suited for large capacity handling.

The present invention has for its object to provide an apparatus for washing bottles, particularly milk bottles, under which considerable economies in costs are obtainable and also large capacity handling facilitated.

Basically, the new apparatus is characterized in that the bottles are automatically washed while still remaining in the crates used in the distribution of the bottles.

The invention is fully described aided by reference to the accompanying drawings wherein:

FIG. 1 is a longitudinal sectional view diagrammatically illustrating the new apparatus.

FIG. 2 is a side view of one of the crate carriers used in the apparatus.

FIG. 3 is a plan view of FIG. 2.

FIG. 4 is an end view of FIG. 2.

FIG. 5 is a detail view showing means used for reversing the crate carriers.

As is shown in these views, the apparatus comprises an entrance section 1, a pre-rinse section 2, a main soaking and washing section 3, a spray washing section 4, a rinse section 5, a drying section 6 and a discharge section 7. The crates containing the bottles are conveyed through the several sections by an endless roller chain conveyor 8 which carries, at spaced intervals, a plurality of crate carriers 9 in which the crates are secured.

The conveyor passes around sprocket wheels 10, 11, 12 and 13, the spocket wheel 11 being driven by any suitable means, such as for example the geneva gear 14, to impact a step by step movement to the conveyor.

The crates are preferably fed to the entrance section 1 by a feed-in conveyor 15 and pass into the crate carriers 9. They are secured to the crate carriers 9 and progress to the pre-rinse section 2, the crate carriers being first reversed at the point 16 so that the bottles are brought mouth downwards. In the pre-rinse section 2, the bottles are sprayed with water, which may be heated, by upper and lower banks 17 and 18 of pressure sprays. The water from the pre-rinse section may be collected in a tank or sump 19 for re-use.

From the pre-rinse section 2, the crates advance to the main soaking and washing section 3 which consists of a long soak tank 20 in which the crates and bottles are immersed and, during passage through said tank, the crates are turned or reversed to facilitate the cleaning of the bottles. The reversing action may be performed in opposite directions for more effective cleaning and the liquid in the soak tank may consist of alkali solution, detergent or the like, heated or otherwise.

From the end of the soak tank 20, the conveyor passes around the sprocket wheel 10 and elevates the crate carriers with the crates to the spray washing section 4 where the bottles are washed by pressure spraying with detergent which is preferably heated. The bottles are still mouth downwards at this stage and are pressure sprayed both externally and internally by upper and lower banks 21 and 22 of spray nozzles. The used detergent is preferably collected in a tank or sump 23 for re-use.

From the spray washing section 4, the crates progress to the rinse section 5 where the bottles are pressure sprayed with rinsing water from upper and lower banks 24 and 25 of spraying nozzles. The rinsing water sprays may consist of two series, the first series spraying hot water and the second series cold water. The rinsing water is collected for re-use in a tank or sump 26.

The conveyor then passes to the driving sprocket wheel 11 during which time the bottles, which are still mouth downwards, drain. The conveyor then passes around the sprocket wheel 11 which reverses the crate carriers and crates so that the bottles are now mouth upwards and the crates then progress through the drying section 6. Said section is preferably in the form of a long horizontal tunnel 27 wherein the bottles are subjected to a current of air from a blower 28 for drying and cooling.

The crates finally progress down a sloped portion 29 to the discharge section 7 where the crates are released from the crate carriers and transferred to a discharge conveyor 30 which may convey the crates with the washed bottles to bottle filling and capping apparatus. The conveyor 8 then passes upwardly to the sprocket wheel 12 and returns over the sprocket wheel 13 to the entrance section 1.

The collection tanks or sumps 19, 23 and 26 and also the soak tank 20 may have suitable circulating systems for passing the liquids through filters to remove collected matter, the cleaned liquids being re-used. If the liquids are heated, the circulating systems may also include suitable heaters or heat exchangers for heating the liquids.

The crate carriers 9 may vary in design and the crates may be secured to the crate carriers by any suitable means. FIGS. 2, 3 and 4 show one suitable form of crate carrier and securing means. As shown in these views, the crate carrier comprises a frame 31 constructed to be open at the bottom so that it engages the crate of bottles from the top. The frame comprises side members 32 and end members 33 forming a skeleton-like enclosure for the crate.

The upper portion of the crate carrier has a grid 34 consisting of a plurality of parallel rods 35 appropriately spaced to engage the tapered necks of the bottles in the crates and retain the bottles against dislodgment. Said grid rods are supported by stems 36 at their ends so that they extend downwardly into the crate a sufficient distance to engage the necks of the bottles while leaving the mouths unobstructed, see FIG. 2.

Supported by each of the sides 32 of the crate carrier is a downwardly extending torsion rod 37 having at its lower end a downwardly and inwardly inclined portion 38 carrying a roller 39. Said rollers engage cam tracks 40 provided at the entrance section 1 and the discharge section 7 of the apparatus.

When a crate of bottles is being fed into the crate carrier at the entrance section of the apparatus, the cam tracks 40 are so arranged as to cause the inclined lower end portions 38 of the torsion rods 37 to be moved clear of the open lower end of the crate carrier so that the crate fed by the feed-in conveyor 15 can move freely into the carrier. As the crate carrier then advances, the rollers 39 leave the cam tracks 40 and so release the torsion rods 37, the torsion of which causes the inclined lower end portions 38 to be swung inwardly to engage the bottom of the crate, indicated by 41, with a resilient wedging action, see FIG. 2. This causes the crate to be securely gripped and held in the crate carrier and also further functions to press the crate upwardly so that the tapered necks of the bottles are engaged with the grid 34.

The crate remains securely held in the crate carrier during the whole of the washing operations, including the inversion of the crates at the point 16 to bring the bottles mouth downwards and the turning or reversing action in the soak tank 20. The bottles are also securely held by the grid 34 so that they cannot fall out of the crate when it is reversed.

At the delivery section 7 of the apparatus, the rollers 39 engage the cam tracks 40 provided at such section and the lower inclined portions 38 of the torsion rods are moved clear of the crate so that the crate with the washed bottles passes freely to the discharge conveyor 30.

The mechanism for reversing the crate carriers 9 to reverse the crates may take many different mechanical forms. One suitable form is shown in FIGS. 4 and 5. As is shown in such views, the crate carriers 9 each have, on the end members 32, pintles 42 which are pivoted in the rollers 43 of the roller chain conveyor 8. Said rollers move in guideways 44 which form the track for the conveyor. The crate carrier end members 32 also have upper and lower cam faces 45 and 46 which are engaged by rollers 47 arranged adjacent to the conveyor guideways 43 at the point 16 and along the length of the soak tank 20. The rollers engage the cam faces 45 or 46 as the crate carrier advances, and cause the crate carrier to pivot on the pintles 42 and reverse as shown in FIG. 5.

By arranging the rollers 47 above or below the pintles 42, the crate carriers 9 can be reversed in either direction, as is desired, and also returned to normal position. In the soak tank 20, the crate carriers are preferably reversed several times and also in different directions to create desirable turbulence of the detergent in the bottles for effective washing.

To ensure that the crate carriers turn completely in their reversing movements, rollers 48 may be provided on the crate carrier end members 32 to engage inclined surfaces 49 arranged adjacent to the conveyor guideways 43. As the crate carriers advance, after having been turned by the action of the rollers 47 and cam surfaces 45 and 46, the rollers 48 engage the inclined surfaces 49, see FIG. 5, and move the crate carrier to the complete turned position. Two sets of rollers 48 are provided on either side of the pintles 42 to provide for reversal of the crate carriers in either direction and, of course, the inclined surfaces 49 are arranged above or below the conveyor guideways 43 according to the direction of reversal of the crate carrier.

By the apparatus described, bottles can be washed more expeditiously and economically than hitherto and with less labor and handling.

What I claim is:

1. Apparatus for washing bottles without removal from conventional transporting crates having side and bottom walls and open at the top, comprising an endless conveyor, crate carriers at spaced intervals along said conveyor to each receive a crate of bottles, means for moving the conveyor, means for reversing the crate carriers at periods during their movement, means for securing the crates in the carriers including means to prevent the bottles from falling out when the carriers are reversed, means for washing the bottles at points during the movement of the crate carriers, said means for securing the crates in the crate carriers including spreadable resilient members which engage the side walls of the crate to secure it in the crate carrier, and means for automatically spreading said resilient members to clampingly engage and release the crates when being fed into and removed from the crate carriers.

2. Apparatus as claimed in claim 1 wherein the means for reversing the crate carriers comprise pintles on which the crate carriers can turn, cam plates on the sides of the crate carriers and rollers at selected points to engage said cam plates and automatically reverse the crate carriers on the pintles as they advance.

3. Apparatus as claimed in claim 2 wherein the crate carriers also have rollers adapted, as the crate carrier advances after being reversed, to engage inclined surfaces and ensure that the crate carrier completes its reversing movement.

4. Apparatus for washing bottles comprising an endless conveyor; crate carriers at spaced intervals along said conveyor to each receive a crate of bottles; means for moving the conveyor; means for reversing the crate carriers at periods during their movement; an entrance section wherein the crates of bottles are fed to the crate carriers, means for securing the crates in the carriers in such manner that the bottles are prevented from falling out when the carriers are reversed; means for washing the bottles at points during the movement of the crate carriers and including a pre-rinse section wherein the bottles are given a first rinse, a main soaking and washing section wherein the bottles are immersed and washed in detergent, and a rinse section wherein the bottles are rinsed after washing; a drying section wherein the bottles are drained and dried; and a final discharge section wherein the crates of bottles are fed from the crate carriers; said main soaking and washing section including a soak tank filled with detergent in which the bottles are immersed and the crate carriers are reversed during passage through said tank and wherein successive reversals of the crate carriers is performed in opposite directions.

5. Apparatus for washing bottles comprising an endless conveyor, crate carriers at spaced intervals along said conveyor to each receive a crate of bottles, means for moving the conveyor, means for reversing the crate carriers at periods during their movement, means for securing the crates in the carriers in such manner that the bottles are prevented from falling out when the carriers are reversed, and means for washing the bottles at points during the movement of the crate carriers, said means for securing the crates in the crate carriers including torsion members having inclined portions which engage the crate to secure it in the crate carrier, and rollers on said torsion members and engaging cam tracks to automatically actuate the torsion members when the crates are being fed into and removed from the crate carriers.

6. Apparatus as claimed in claim 1 wherein said means for moving the conveyor comprises a step by step advancing mechanism.

7. Apparatus as claimed in claim 1 wherein said means to prevent the bottles from falling out comprises a grid to engage the necks of the bottles in the crates and retain the bottles against dislodgement in the upper portion of each crate carrier.

8. Apparatus as claimed in claim 5 wherein said means for reversing the crate carriers comprises means for performing successive reversals in opposite directions.

References Cited in the file of this patent

UNITED STATES PATENTS

| | | |
|---|---|---|
| 768,486 | Schreiber | Aug. 23, 1904 |
| 1,427,653 | Streich | Aug. 29, 1922 |
| 1,498,198 | Philips | June 17, 1924 |
| 2,024,373 | Ladewig | Dec. 17, 1935 |
| 2,219,007 | Dostal | Oct. 22, 1940 |
| 2,250,238 | Smith | July 22, 1941 |
| 2,514,304 | Bacon | July 4, 1950 |
| 2,629,675 | Quimby | Feb. 24, 1953 |
| 2,681,872 | McCabe | June 22, 1954 |
| 2,943,424 | Sadwith | July 5, 1960 |